(12) United States Patent
Blumenau

(10) Patent No.: US 6,442,659 B1
(45) Date of Patent: Aug. 27, 2002

(54) RAID-TYPE STORAGE SYSTEM AND TECHNIQUE

(75) Inventor: Steven M. Blumenau, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/024,177

(22) Filed: Feb. 17, 1998

(51) Int. Cl.[7] ................................. G06F 12/02
(52) U.S. Cl. ........................... 711/162; 711/114
(58) Field of Search ..................... 711/114, 112, 711/111, 161, 162, 113; 455/6.1; 714/6

(56) References Cited

U.S. PATENT DOCUMENTS

| | | | | |
|---|---|---|---|---|
| 5,463,765 A | * | 10/1995 | Kakuta et al. | 395/182.04 |
| 5,537,588 A | * | 7/1996 | Engelmann et al. | 395/600 |
| 5,584,008 A | * | 12/1996 | Shimada et al. | 395/441 |
| 5,630,092 A | * | 5/1997 | Carreiro et al. | 711/111 |
| 5,652,857 A | * | 7/1997 | Shimoi et al. | 711/113 |
| 5,790,773 A | * | 8/1998 | DeKoning et al. | 714/6 |
| 5,909,638 A | * | 6/1999 | Allen | 455/6.1 |
| 6,058,462 A | * | 5/2000 | West et al. | 711/162 |
| 6,076,143 A | * | 6/2000 | Blumenau | 711/114 |
| 6,151,665 A | * | 11/2000 | Blumenau | 711/162 |
| 6,170,037 B1 | * | 1/2001 | Blumenau | 711/114 |

OTHER PUBLICATIONS

Microsoft Press, Computer Dictionary, (c) 1994, pp. 291–292.*

* cited by examiner

*Primary Examiner*—Matthew Kim
*Assistant Examiner*—B. R. Peugh
(74) *Attorney, Agent, or Firm*—John M. Gunther; Leanne J. Fitzgerald; R. Kevin Perkins

(57) ABSTRACT

In an aspect, the invention features a method of storing data in a digital data storage system that includes a plurality of disk drives. The method involves receiving data at the data storage system; compressing the received data to generate a compressed version of the data; storing the received data on a first set of disk drives among the plurality of disk drives; and storing the compressed version of the received data on a parity disk drive so that the parity drive stores data that is redundant of data that is stored on the first set of drives.

11 Claims, 2 Drawing Sheets

RAID-TYPE STORAGE SYSTEM AND TECHNIQUE

BACKGROUND OF THE INVENTION

The invention relates generally to redundant storage techniques for use with data storage systems that include an array of digital data storage disks.

RAID is an acronym for Redundant Array of Individual Disks. It is a technology that has been developed to provide data redundancy to protect against disk failures in the storage system. RAID 1, which provides the simplest form of redundancy, involves simply mirroring the normal data to another disk, so that the same data is stored on two different disks. Thus, if the main storage disk fails, the controller in the storage system need only direct its accesses to the second disk where all of the same data is stored. In other words, a failed disk will not result in the loss of data to the system. Of course, this form of redundancy is expensive because it requires twice as much storage space, every disk has to have its mirror.

To reduce the amount of storage required to support the data redundancy, other forms of RAID technology have developed. The price typically paid by these other techniques for lower storage requirements is less redundancy. For example, there is RAID 4 according to which the system generates parity information by XOR'ing the data on two or more other disks and then storing the result on another drive. So, for example, assume that the parity is generated from data stored in three disks. In that case, the corresponding set of data on each of the three disks is XOR'ed together to produce a parity block. The parity information generated in that way is then stored on a fourth disk. Thus, if one of the first three disks fails, the data that was stored on that disk can be generated from the data that is stored on the parity disk and the two other disks.

There are modifications of the last technique described above. For example, the parity can be bit-interleaved parity which is stored on a dedicated disk, as in the case of RAID 3, or it can be block-interleaved parity stored on a dedicated disk, as in the case of RAID 4. Alternatively, it can be block-interleaved parity that is spread (stripped) across multiple disks so that each disk in the system contains both normal data and parity data. In that case, however, the parity data is still stored on a different disk from the disks which contain the data from which the parity information was generated.

SUMMARY OF THE INVENTION

The present invention relates to a new RAID technique which is referred to herein as RAID C or RAID Compressed. This new type of RAID generates a compressed image of a data set and uses that as the parity information. In other words, instead of performing an XOR operation on the image set of data, as is done for RAID 3 or RAID 4, a compression algorithm is applied to the image set of data to produce the parity information that is stored on a separate disk from where the image set of data is stored.

In general, in one aspect, the invention is a method of storing data in a digital data storage system that includes a plurality of disk drives. The method includes the steps of receiving data at the data storage system; storing at least a portion of the received data on a first set of disk drives among the plurality of disk drives; compressing the portion of received data; and storing the compressed data on a parity disk drive so that the parity drive stores data that is redundant of data stored in the first set of drives.

In preferred embodiments, the step of storing the portion of received data involves storing that data without first compressing it. The parity drive is different from the first set of drives. The method also includes the step of assigning the parity drive to be a dedicated drive for storing parity information. The step of receiving data involves storing the data in a cache memory and the method further includes the step of destaging that data from the cache memory to the plurality of drives, wherein the step of destaging involves the first and second mentioned storing steps and the compressing step. The step of storing at least a portion of the received data on the first set of drives involves first compressing that data and then storing it on the first set of drives.

In general, in another aspect, the invention is a method of storing data in a digital data storage system that includes a plurality of disk drives. The method includes the steps of receiving N blocks of data; storing the N blocks of data on a first set of disk drives among the plurality of disk drives, wherein each block of the N blocks is stored on a different disk drive; and compressing the N blocks of data; and storing the compressed data on a parity disk drive so that the data storage system simultaneously stores the N data blocks in uncompressed form and the compressed data in different places.

In general, in still another aspect, the invention is an apparatus for storing data including a plurality of disk drives; a cache memory; a compression engine; and a controller which destages data stored from cache memory into the plurality of disk drives. The controller is programmed to perform the functions of: collecting a plurality of data blocks stored in the cache memory, causing the compression engine to compress the data in the aggregation of data blocks, storing the compressed data in a parity drive said parity drive being one of the plurality of disk drives, and storing each of the plurality of data blocks in a different one of the plurality of disk drives none of which is the parity drive.

Among other advantages, the invention provides an alternative type of RAID that enables one to reconstruct lost data without involving any drives other than the parity drive. An implication of this is that even if all normal drives fail, the data can be recovered from the parity drive. Also, the invention provides a way of substantially reducing the time required to perform backup and/or to transmit stored data to another system since the smaller amount of compressed data on the parity drive can be sent rather than the corresponding larger amount of uncompressed data on the normal drives.

Other advantages and features will become apparent from the following description of the preferred embodiment and from the claims.

DESCRIPTION OF THE PREFERRED EMBODIMENTS

Figure 1:
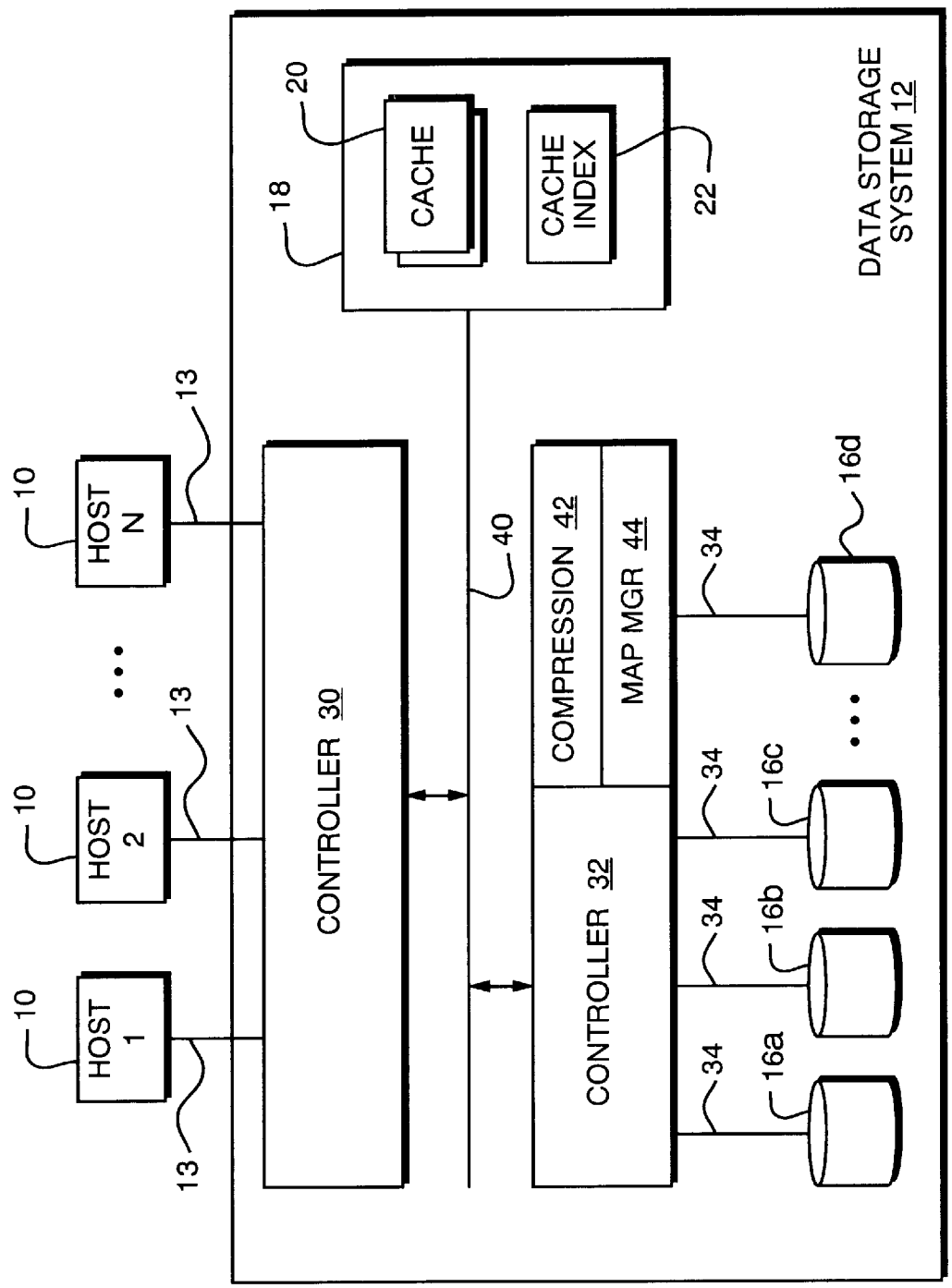
FIG. 1 is a block diagram of a data storage system which implements RAID C.

In general, the storage technique described herein is applicable to data storage systems which employ one or more arrays of independent disks. One such typical data storage system is illustrated in FIG. 1 which shows a plurality of host processors 10 that are connected to a central data storage system 12 through respective host connections 13. Host processors 10 are digital processing units which include one or more CPU's and main memory. They might be, for example, workstations, PC's, symmetric multiprocessors (SMPs) or a massively parallel processor (MPP), which has many CPU's.

In the described embodiment, host processors 10 have UNIX operating systems which provide the normal set of services that are typical of that operating system. In addition, communications over connections 13 between host processors 10 and data storage system 10 are handled in accordance with a SCSI bus protocol. SCSI, which stands for Small Computer System Interface, is a widely used peripheral interface for transferring data and commands between a host processor and external devices, such as a mass storage devices including disk drives, tape devices, and other a data storage devices. The SCSI bus protocol makes available a number of commands for querying the devices connected to the SCSI bus about certain parameters.

It should, of course, be understood that the host processors could be running other operating systems and other interfaces could be used for communicating between the host processors and the data storage system. For example, the host processors could be running an IBM MVS operating system and the communication interface could be using channel command words.

Data storage system 12 contains the physical memory in which the data is stored. Examples of commercially available products that can be used to implement data storage system 12 are the Symmetrix 5XXX™ series family of products from EMC Corporation of Hopkinton, Mass., which are high performance integrated cache disk arrays designed for online data storage. The following details about the internal structure and operation of data storage system 12 generally apply to the Symmetrix™ data storage systems. However, it should be understood that other designs known to persons skilled in the art may also be used to implement data storage system 12.

Data storage system 12 includes multiple arrays of disk devices 16a–d (referred to hereinafter generally as disk devices 16) and a system memory 18, a part of which implements a cache memory 20. The multiple arrays of disk devices 16 provide a permanent data storage area and cache memory 20 provides a fast as well as temporary data storage area. Each disk device within an array of disk devices 16 includes a head-disk assembly, a microprocessor, and a data buffer which enables the data storage system to provide for parallel processing of data. In the described embodiment, system memory 18 is implemented by high-speed random-access semiconductor memory. Within system memory 18 there is a cache index directory 22 which provides an indication of what data is stored in cache memory 20 and the address of that data in cache memory 20.

Data storage system 12 also includes a front end controller 30 that handles communications between data storage system 12 and host processors 10. Front end controller 30 includes a group of channel adapters and channel directors (not shown) that provide interfaces through which host processors 10 connect to data storage system 12. Each channel adapter provides for direct attachment to the physical host connections. The channel directors contain a microprocessor that processes commands and data from host processors 10 and manages accesses to cache memory 20. A channel director handles I/O requests from host processors 10. It uses cache index directory 22 to determine whether the request can be satisfied out of the cache or whether the data must be obtained from disk devices 16. The channel directors write data from host processors into cache memory 20 and update cache index directory 22. They also access cache index directory 22 and read data from cache memory 20 for transfer to host processors 10.

There is also a back end controller 32 which handles communications between cache memory 22 and the disk devices 16. Back end controller 32 includes a group of disk adapters and disk directors (not shown) through which each disk array among the disk devices 16 is connected to cache memory 20. The disk adapter interfaces to multiple SCSI buses 34 to which disk devices 16 are connected. The disk directors manage accesses to the disks within disk device arrays. The disk directors stage data from the disk device arrays to cache memory 20 and they update cache index directory 22, accordingly. They also de-stage or write-back data from "written-to" blocks in cache memory 20 to the disk devices 16 and again update cache index directory 22, accordingly. In general, back end controller 34 maintains data in cache memory 20 based on the data access patterns.

The disk adapters in back end controller 32 and the channel adapters in front end controller 30 access system memory 18 through a high-speed, parallel line system bus 40. In the described example, system memory 18 is implemented by multiple memory boards. Only one access to any given memory board may occur at any given time, however, multiple memory boards may be accessed at the same time to support concurrent operations, i.e., parallel transfer of data from disk storage to cache memory.

Back end controller 32 also includes a compression engine 42 and a map manager 44. Compression engine 42 compresses data from cache for storage as the parity information on a dedicated parity disk or group of disks, shown in FIG. 1 as disk 16(d). It also decompresses data that is retrieved from the parity disk 16(d) into cache memory 20. Map manager 44 keeps track of where the compressed data is stored on the disks 16.

There are multiple compression algorithms that are known in the art from which the compression algorithm that is implemented by compression engine 42 might be selected. The particular compression algorithm that is used is not of central importance. Two well known and commercially available possibilities, just to name some examples, include one using the windows-based LZ (Lempel-Ziv) or LZW (Lempel-Ziv-Welch) (byte level) compression algorithm which provides an average compression of about 2:1 and speeds of about 5 MB/sec or another using the IDRC (Improved Data Recording Capability (bit level) compression algorithm from IBM which provides an average compression of about 3:1 and speeds of about 6 MB/sec. In the described embodiment, the actual compression is performed using hardware compression, though it could also be performed through software or a combination of software and hardware.

In the described embodiment, actual compression is done using a two-stage cache. The first stage, or primary cache, is used to satisfy I/O requests and it only contains non-parity (i.e., uncompressed) data. The second stage, or secondary cache, is used as a staging area for compression.

The particular strategy for storing the compressed data is not of central importance. Any one of a number of different known techniques may be used. For example, the disk drive on which the compressed data is stored can be divided into fixed size blocks, with the size selected to equal the level of compression that is believed to be possible for the data. In the cases in which actual compression is not as good as desired resulting in the compressed data occupying a larger space than is available in the fixed size block, then the overflow data (i.e., the amount by which the compressed data exceeds the block capacity) is stored in a different part of the drive (i.e., an overflow area). The map manager 44 keeps track of where that overflow data is stored.

Alternatively, the compressed data can be stored sequentially on the disk. In other words, the newly compressed data is simply added to the end of the logical storage space. In that case, there will not be a problem with having to deal with overflow data. However, holes will be created in the storage space from where data has been retrieved to be modified. That data, when stored back to the disk at the end of the logical storage space, will leave an unused space at the location from where it was retrieved. The map manager 44 keeps track of these holes and either uses them when possible or periodically reorganize the storage at appropriate times to eliminate or consolidate the unused space so that it again becomes usable.

It should, of course, be understood that these two alternative approaches to organizing the parity information are presented merely as illustrations and by selecting them, it is not meant to imply that another approach to organizing the data in storage could not also be used.

In the described embodiment, data from the host processors 10 is written to cache memory 20 and, at appropriate times, it is destaged to the disk devices. At that time, compression engine 42 within back end controller 44 collects a group of blocks, each of which will be destaged to a different disk and compresses those blocks of data for storage on the parity disk 16(d) as the parity information. This is more clearly illustrated in FIG. 2 which shows three disks for storing normal data and a fourth disk for storing parity information for the data stored on the other three disks. In this example, it is assumed that the compression algorithm that is implemented with the compression engine 42 is designed to achieve a 3:1 compression ratio, though of course the actual compression that is achievable depends upon the type of data that is being compressed. In fact, in setting up the data storage system, it may be desirable to select the target compression ratio depending on the type of data that is being stored. For example, if the executable code is being stored, a more realistically achievable compression ratio might be about 2:1; whereas in the case of typical database data (e.g. financial data) a much higher compression ratio might be achievable, e.g. 10:1. The achievable compression ratio has bearing on how the compressed data is stored on the parity drive, e.g. the size of the storage areas that are used in the case of a drive that is organized as a sequence of fixed size storage areas, as noted above.

Figure 2:
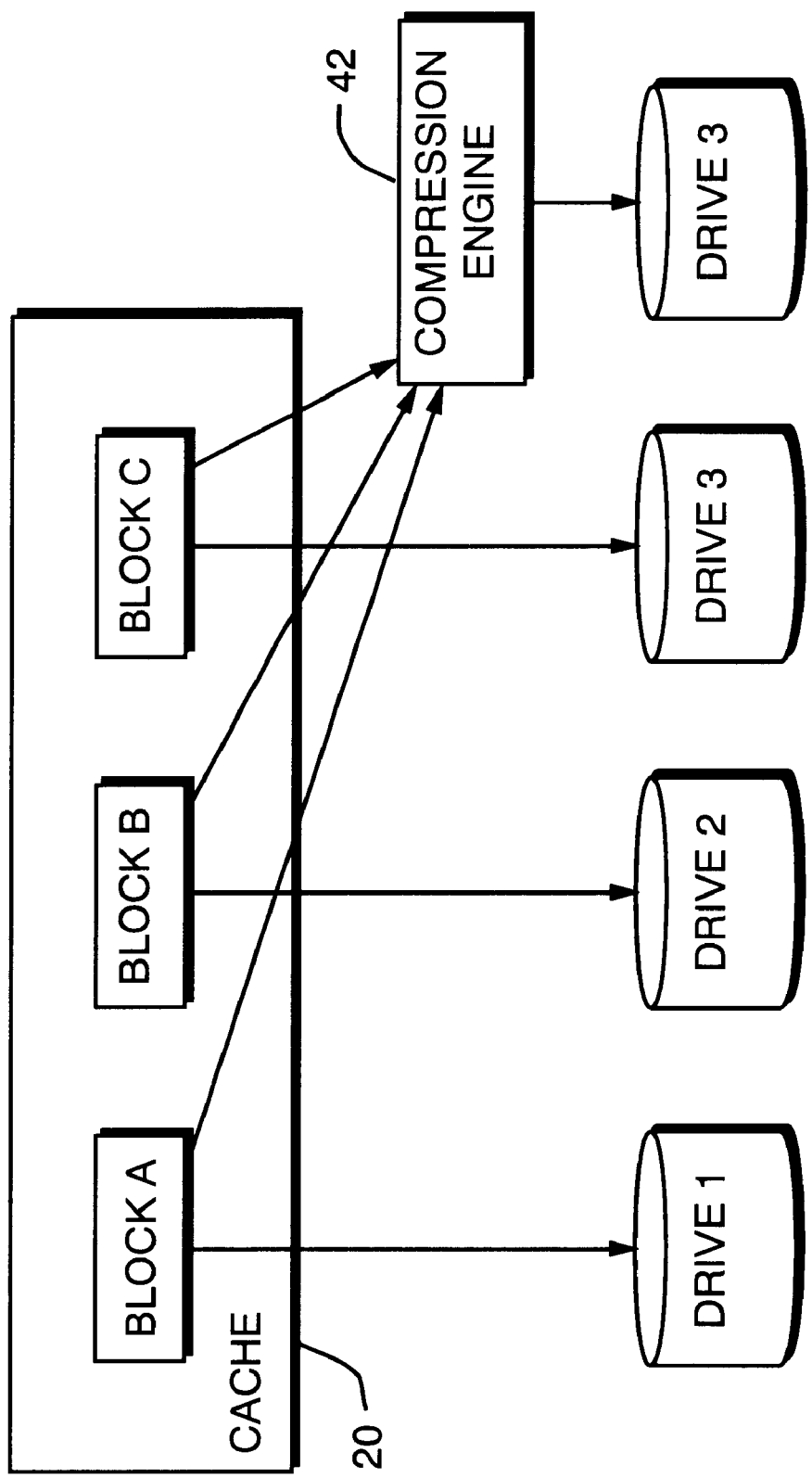
FIG. 2 is a block diagram illustrating the RAID C technique.

As illustrated in FIG. 2, the host processors write data to the storage system which stores that data in its cache memory until it is ready to be destaged. In this case, the data that has been written to cache memory includes three blocks labeled Block A, Block B, and Block C (e.g. with 128 or 512 bytes per block). These might be contiguous blocks of data, though they need not be. The advantage of course of using contiguous blocks is that reading data from the parity drive provides a read ahead capability, as described in more detail below.

When it is time to destage data from cache to the disk devices (shown here as Drives 1–3), controller 32 selects the group of blocks that will be compressed (in this case, Blocks A, B, and C), compresses the data in those blocks, and stores the results in the parity drive, labeled here as Drive P. It also stores each of the three blocks which were compressed in a different one of the other drives on which normal data is stored. Thus, for example, Block A might be stored in Drive 1, Block B in Drive 2, and Block C in Drive 3, as indicated.

Note that an important restriction is that the normal data and the parity information (i.e., the compressed data) corresponding to that normal data cannot share the same spindle. The parity information must be accessible after the failure so as to recover from the data loss on a failed drive (assuming that it is a drive that stores normal data). Indeed, since the parity information contains all of the information that is required to reconstruct each of the original blocks from which the parity data was derived, all of the normal drives can fail and the data that was stored on them will still be recoverable from the parity drive. Also note that in the case of a failed disk, there will be some I/O degradation which occurs only for data that was stored on the actual failed disk. No other disks beyond the parity disk will be required to reconstruct the data that was on the failed disk.

Of course, the restriction that parity information cannot be on the same drive as any of the data from which it was derived does not imply that the parity information must be stored on a dedicated drive. It could be spread across multiple drives as it is in the case of RAID 5.

As noted above, however, in the described embodiment, the parity information was placed on a dedicated compression drive. Whenever the storage system reads the compressed data, as it would need to do for writes, there is a penalty that must be paid, namely, the overhead of running the management system including the delay and resource commitment associated with uncompressing the data. By placing all of the parity information on a dedicated drive, this overhead of running the management system is isolated to the parity disk which is typically only accessed when writes are performed. Since typically most (e.g. 80%) of the activity of the data storage system is in the form of reads to support the applications running on the host processor(s), the management load associated with the writes is limited to the dedicated drive and does not impact the other drives as it would if the parity was spread over all of the drives.

The following is an analysis of the I/O operations that are required for reads and writes in a system that implements the RAID C.

In the case of a normal read, the read request can be satisfied from the normal data stored on disk. It is also possible, however, to retrieve the compressed data at the same time and satisfy the read from the normal data while the compressed data is being decompressed by the compression engine. Doing this provides a prefetch feature since the decompressed data represents N blocks, namely the target block as well as the other N–1 blocks with which it was compressed. Thus, read ahead to these blocks can be satisfied directly from cache memory. In a 2:1 compressed system, the cost of the read ahead will be ½ as compared to having to retrieve that block from disk.

In degraded operation (i.e., when one of the disks storing normal data has failed), reads to the functioning disks are unaffected. Whereas, reads to the failed disk can be satisfied by reading and decompressing the parity data and they will not require any other information from the system. Contrast this to a RAID 3 or a RAID 4 system in which the data on the failed disk can only be constructed by reading the data on the other disks plus the parity information.

As suggested above, a sequential mode of operation is also possible. In that case, both the normal data and the parity data is retrieved. The parity data, once decompressed, supports read ahead as described above.

In the case of a normal write, only one more write is required than in a RAID 1 system. That is, there will be three I/O's instead of two. One I/O is used to read the old parity information into cache memory. A second I/O is used to write out the normal data. And the third I/O is used to write out the new parity data back to the disk. This could be reduced to two I/O's by not requiring that the new parity information be generated from the original set of blocks but by allowing the new data to be mapped into a new set of blocks for compression. This would then require one I/O for a normal write and a second I/O for the parity write. In that case, the map manager keeps track of the fact that the compressed data in the old parity block contains a block that has been replaced by a block stored elsewhere. Also, a downside of doing this is that since the blocks will not be stored in sequential order, read aheads will not be possible, as described above.

Since data can be mapped and written to any location within the array of disk drives, there are not really any degraded writes. If a drive fails, the normal writes can be simply written to another drive. However, if there is no other storage available, then only the parity information would be stored. The case of the degraded parity write requires two I/Os, one I/O required to read the [parity data and a second I/O to write the new parity information.

Start up of a data storage system that is implementing RAID C or is being converted to a RAID C system can be handled in the following way. The system would start with either as an empty storage system, or a mirrored system (e.g. RAID 1). The map manger then generates a map of where all of the existing data is stored. The data storage system scans a sample set of data that is provided by the customer (e.g. through the host computers) to evaluate the amount of expected compression that will be achievable. Note that an existing mirrored system (i.e., a RAID system) represents the worst case compression parity state (i.e., compression ratio of 1:1). As the data is modified, sets of blocks are grouped and compressed and the resulting compressed data replaces the mirrored data. Thus, as the system is being used and the compressed data becomes the parity data, the amount of storage that is available to the user will actually increase since the compressed data, by assumption, takes up less space than the actual data which previously occupied the mirror drive.

One type of optimization that can be used is to base the size of the group that is compressed on the frequency of access of the blocks in the group. In other words, blocks that are accessed most frequently would not be compressed whereas blocks that are accessed least frequently would be aggregated into larger groups before compression.

Also note that using compressed data as the parity data also provides further benefits for system backup. Instead of backing up the original data, one can back up the compressed data thereby increasing the rate at which the data can be read by 2–3 times that achievable by reading the normal data. Moreover, if the map manager keeps track of the parity blocks that have changed since the last backup, then incremental backups can easily be performed, copying only those parity blocks that have changes since the last backup was performed.

A modification of the RAID C approach involves performing compression on all data. That is, compressed data is stored in the data storage system and it is mirrored to another drive. This would be like RAID 1 but with compressed data. With that approach, the compression engine would compress the data and the destaging algorithms would simply store it to two different drives. Of course, the data storage system would have to run the management system all of the time. But that may be preferable if the price of storage is particularly high.

Also, even though the compression/decompression algorithm was described as residing in the back end controller, it should be understood that placing it there is not the only option. As two possibilities, just to name a few, compression and decompression can reside in the front end controller or they can be distributed. For example, in the embodiment which stores the compressed data both on the normal drives and on the parity drive, it may make more sense to place the compression functionality in the front end controller.

The invention is meant to cover all of the above-mentioned alternative approaches as well as others not specifically mentioned. The above-mentioned embodiments and others are within the following claims.

What is claimed is:

1. A method of storing data in a digital data storage system that includes a plurality of disk drives, said method comprising:

receiving data at the data storage system;

compressing at least a portion of the received data to generate a compressed version of the received data;

performing a storing operation that initiates a first phase and a second phase, said first phase involving storing said at least a portion of the received data on a first set of disk drives among the plurality of disk drives, and said second phase involving storing the compressed version of the received data on a second disk drive among the plurality of disk drives so that the second disk drive stores data that is redundant of data that is stored on the first set of drives.

2. The method of claim 1 wherein the step of storing said at least a portion of the received data on the first set of drives involves storing said at least a portion of the received data without first compressing it.

3. The method of claim 2 further comprising assigning the second drive to be a dedicated drive for storing redundant information.

4. The method of claim 2 wherein the step of receiving data comprises storing said data in a cache memory and said method further comprises destaging said data from said cache memory to said plurality of drives, and wherein the step of destaging comprises performing said compressing step and said storing operation.

5. The method of claim 2 wherein the step of receiving data comprises storing said received data in a cache memory and said method further comprises destaging the stored received data from said cache memory to said plurality of drives, and wherein the step of destaging comprises said compressing step and said storing operation.

6. The method of claim 1 wherein the step of storing at least a portion of the received data on said first set of drives comprises first compressing said at least a portion of the received data and then storing it on said first set of drives.

7. A method of storing data in a digital data storage system that includes a plurality of disk drives, said method comprising:

receiving N blocks of data;

compressing the N blocks of data;

performing a storing operation that includes a first phase and a second phase, said first phase involving storing the N blocks of data in an uncompressed form on a first set of disk drives among the plurality of disk drives, wherein each block of the N blocks is stored on a different disk drive, and said second phase involving storing the compressed data on a second disk drive among the plurality of disk drives so that the data storage system simultaneously stores the N data blocks in one physical location in uncompressed form and in another physical location in compressed form.

8. The method of claim 7 wherein the second drive is different from the first set of drives.

9. The method of claim 7 further comprising assigning the second drive to be a dedicated drive for storing redundant information.

10. The method of claim 7 wherein the step of receiving N blocks of data comprises storing said received N blocks of data in a cache memory and said method further comprises destaging the stored received data from said cache memory to said first set of drives, and wherein the step of destaging comprises the compressing step and said storing operation.

11. An apparatus for storing data comprising:

a plurality of disk drives;

a cache memory;

a compression engine; and a controller which destages data stored from cache memory into the plurality of disk drives, wherein said controller is programmed to perform the functions of:

collecting a plurality of data blocks stored in the cache memory, causing the compression engine to compress the data in the collected plurality of data blocks, performing a storing operation that includes a first phase and a second phase, said first phase involving storing the compress data on a first drive, said first drive being one of the plurality of disk drives, and said second phase involving storing each of the plurality of data blocks in a different one of the plurality of disk drives none of which is the first drive.

* * * * *